United States Patent

Vogelsberg

[15] 3,675,044

[45] *July 4, 1972

[54] SILICON CONTROLLED RECTIFIER FORWARD AND REVERSE SHIFT REGISTER

[72] Inventor: Walter H. Vogelsberg, Carversville, Pa.

[73] Assignee: Wheaton Industries, Millville, N.J.

[ * ] Notice: The portion of the term of this patent subsequent to Feb. 16, 1988, has been disclaimed.

[22] Filed: Jan. 7, 1971

[21] Appl. No.: 104,643

[52] U.S. Cl. ....................................307/221 B, 307/222 B

[51] Int. Cl. ....................................G11c 19/00, H03k 21/00

[58] Field of Search ...........307/221, 221 B, 222, 224, 224 B, 307/260, 268

[56] References Cited

UNITED STATES PATENTS 3,371,222 2/1968 Guettler et al. ....................307/222 B 3,317,751 5/1967 Libby et al. ........................307/222 B 3,482,114 12/1969 Marshall.............................307/221 B

*Primary Examiner*—John Zazworsky

*Attorney*—Anthony T. Lane and Fred L. Witherspoon, Jr.

[57] ABSTRACT

A silicon controlled shift register capable of shifting in a forward or reverse direction and shifter circuits for controlling the register are disclosed. The shift register is made up of a plurality of identical stages. Each stage comprises an input circuit, one silicon controlled rectifier, signal storage means, signal output means, a forward signal transfer means, and a reverse signal transfer means. The register can be operated as a serial register with a single input and a single output or it can be operated in a ring fashion or a plurality of inputs and outputs can be provided. The register is particularly adaptable to machine control and to the control of industrial processes. Several different shifter circuits and a special input circuit are disclosed. The shifter circuits range from mechanical switching circuits to electro-mechanical switching circuits.

41 Claims, 5 Drawing Figures

INVENTOR
WALTER H. VOGELSBERG
BY Schellin + Hoffman
ATTORNEYS

INVENTOR

WALTER H. VOGELSBERG

BY Schellin + Hoffman

ATTORNEYS

INVENTOR
WALTER H. VOGELSBERG
BY Schellin & Hoffman
ATTORNEYS

SILICON CONTROLLED RECTIFIER FORWARD AND REVERSE SHIFT REGISTER

BACKGROUND OF THE INVENTION

This invention relates to shift registers and more particularly to a forward and reverse shift register using silicon controlled rectifiers and the shifter circuits for operating the register.

In my copending application, Ser. No. 812,253, filed Apr. 1, 1969 now U.S. Pat. No. 3,564,282, I have disclosed a silicon controlled shift register and ring counter that is particularly adaptable to machine control and to the control of industrial processes. In addition, the said copending application discloses output circuits that may be utilized with the register and discloses two preferred structural embodiments of the shift register-ring counter.

Conventionally, machine and assembly line control has been achieved through the use of complex electro-mechanical devices utilizing relays. While these devices generally provide satisfactory control, they are normally large complex devices requiring a great amount of space and maintenance. The shift register-ring counter disclosed in my said copending application replaces these rather large and complex electro-mechanical devices with a compact and relatively maintenance-free solid state circuit. In fact, this register is now being used to control several different industrial processes. However, my earlier register is limited to those machine or industrial processes that do not require a reverse register, since it can provide only forward shifting. In some industrial control processes, for example, in the packaging machines which may have to be reversed a few cycles to get rid of a jam, both forward and reverse control are required. At present, pin wheel type memories are generally used to provide this type of control. The invention disclosed herein modifies the basic circuitry of my earlier said invention to provide both forward and reverse shift.

Shift registers, particularly those used in industrial processes must be noise immune and shifting circuitry that provides positive operation of the register should be provided for proper trouble free operation. The invention disclosed herein includes several preferred shifting circuits that provide positive trouble free operation.

SUMMARY OF THE INVENTION

Three preferred embodiments of the shift register are disclosed. Basically, the shift register comprises a plurality of cascaded identical stages. Each stage comprises an input circuit, one silicon controlled rectifier, signal storage means, signal output means, forward signal transfer means and reverse signal transfer means. Each stage is also provided with an incandescent lamp to give a visual indication of which stage is turned on.

An input signal applied to anY stage turns on that stage. This input signal is then transferred to storage means associated with this stage and remains stored until it is switched to either the subsequent stage in the forward direction or the preceding stage in the reverse direction.

The shift register is operated by the shifter circuits. The shifter circuits provide selective forward or reverse shifting. Electro-mechanical as well as mechanical shifter circuits are provided. While generally any type of suitable input circuitry can be used with the shift register, a special input circuit that may be used with the register when a "ground"-"not ground" condition is to be sensed and the register operates accordingly is also disclosed herein.

It is therefore an object of this invention to provide a shift register.

Another object of this invention is to provide a forward and reverse shift register.

A further object of this invention is to provide a silicon controlled shift register.

A still further object of this invention is to provide a forward and reverse silicon controlled rectifier shift register.

A still further object of this invention is to provide shifter circuits.

A still further object of this invention is to provide a special input circuit.

BRIEF DESCRIPTION OF THE DRAWING

The above-mentioned and other objects of this invention will be readily apparent from the following detailed description when read in conjunction with the annexed drawings in which like parts in the various figures have like numbers and in which.

DESCRIPTION OF THE INVENTION

Figure 1:
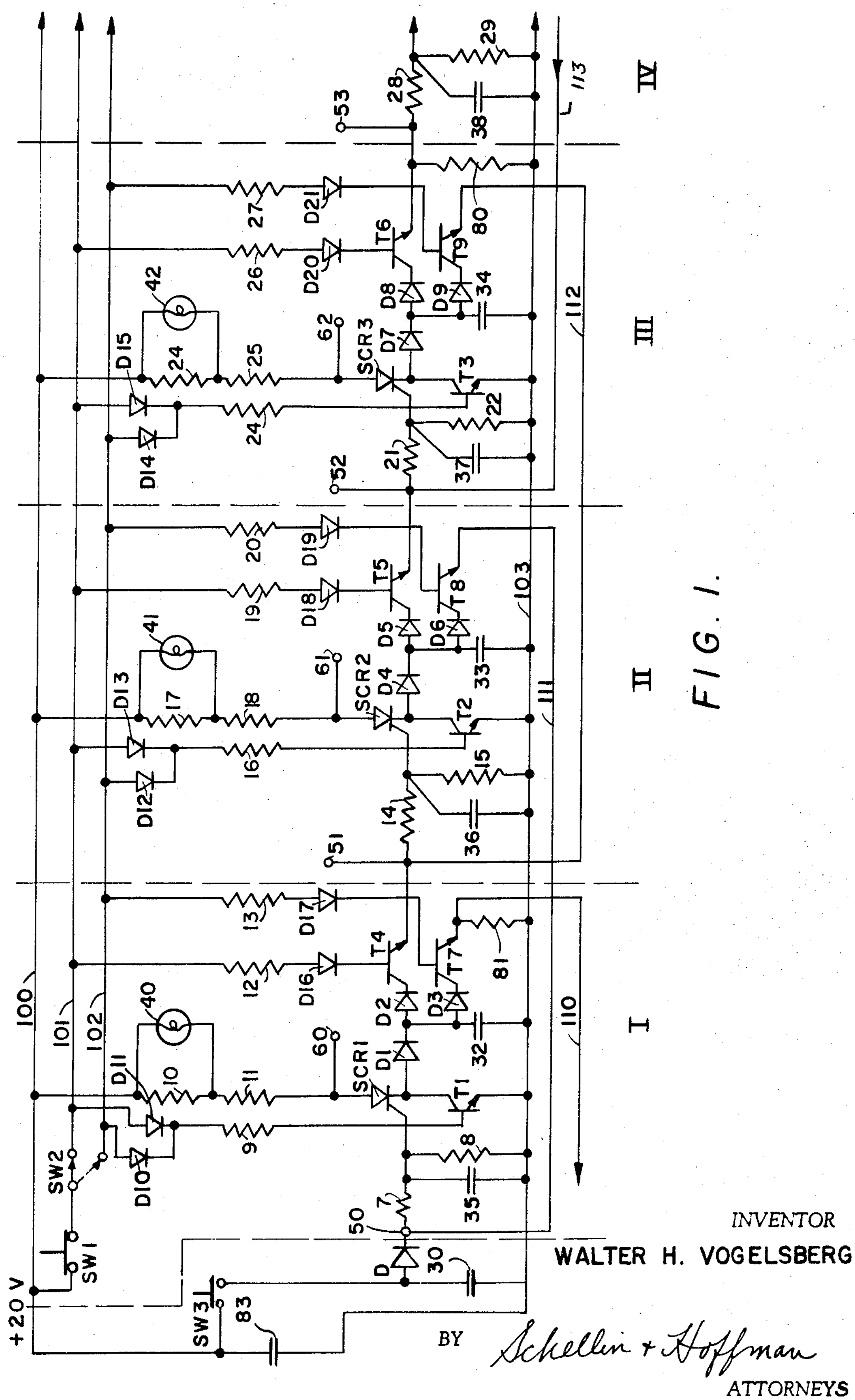
FIG. 1 is a schematic diagram showing one embodiment of the shift register and a shifter circuit used with this register.

Referring now to FIG. 1 which shows in schematic form one embodiment of my forward and reverse shift register, three complete stages, stage I, stage II, and stage III and part of the input circuit of a fourth stage are shown in FIG. 1. A complete stage comprises an input circuit, one silicon controlled rectifier, signal storage means, signal output means, a forward signal transfer means, and a reverse signal transfer means. An incandescent lamp is provided in each stage to give a visual indication of which stage is turned on. In stage I of FIG. 1, the input circuit comprises a pair of resistors 7 and 8 a capacitor 35 and an input terminal 50; the switching means comprises transistor $T_1$; the signal storage means is the capacitor 32; the output means is the output terminal 60; the forward signal transfer means comprises transistor $T_4$; and the reverse signal transfer means comprises transistor $T_7$. Lamp 40 provides the visual indication when stage I is turned on. The silicon controlled rectifier $SCR_1$ is, of course, the single SCR in stage I.

From the foregoing it is obvious that the fourth stage, only the input circuit of which is shown, would be completed by adding a switching transistor, a silicon controlled rectifier, a storage capacitor, a forward signal transfer transistor, a reverse signal transfer transistor, an incandescent lamp, and the various diodes and resistors shown in the other three stages. In order to add an additional stage, stage IV would have to be completed in this manner and then an additional complete stage would be connected to the emitter of the forward signal transfer transistor and the emitter of the reverse signal transfer transistor would be coupled back to the input of the prior stage. Any number of stages can be cascaded in this manner. However, the last stop in the register requires an additional resistor.

In FIG. 1 the additional resistor is the resistor 80 in stage III. An additional resistor is also required in the first stage of the register. This resistor is the resistor 81 in stage I. As will be apparent later from the description of the operation of the circuit resistor 80 and 81 are needed to provide a discharge path for the storage capacitors in the last and first stages of the register respectively. Resistor 80 does not have to be removed when additional stages are added since it merely shunts the input circuit of stage IV. If resistor 80 has a high resistance value, it will obviously have little effect on the input circuit of stage IV.

Referring now in detail to FIG. 1, the anodes of the three silicon controlled rectifiers $SCR_1$, $SCR_2$, and $SCR_3$ are connected through separate pairs of resistors to a positive 20 volt supply line 100. Thus, $SCR_1$ is connected to 20 volt line 100 through the serially connected resistors 11 and 10; $SCR_2$ is connected to 20 volt line 100 through the serially connected resistors 18 and 17; and $SCR_3$ is connected to 20 volt line 100 through the serially connected resistors 25 and 24. The incandescent lamp 40 is connected across resistor 10 in stage I; the incandescent lamp 41 of stage II is connected across resistor 17; and the incandescent lamp 42 of stage III is connected across resistor 24. As has been mentioned above, these lamps give a visual indication that the stage in which the lamp is connected is turned on. For example, when stage I is turned on, lamp 40 is ignited and remains on until stage I is turned off.

The cathode of each of the SCRs 1–3 is connected to the collector electrode of a separate transistor. More specifically, the cathode of $SCR_1$ is connected to the collector electrode of the transistor $T_1$; the cathode of $SCR_2$ is connected to the collector electrode of the transistor $T_2$; and the cathode of $SCR_3$ is connected to the collector electrode of the transistor $T_3$. The emitter electrodes of all of these tranSistors are connected to the common potential line 103. The base of transistor $T_1$ is connected through a resistor 9 and a diode $D_{11}$ to a forward switching line 101 and to reverse switching line 102 through resistor 9 and a diode $D_{10}$. Similarly, the base of transistor $T_2$ is connected through resistor 16 and diode $D_{13}$ to forward line 101 and to reverse line 102 through resistor 16 and diode $D_{12}$; and the base of transistor $T_3$ is connected through a resistor 23 and a diode $D_{11}$ to forward line 101 and through resistor 23 and a diode $D_{14}$ to reverse line 102. The separate input terminals 50, 51 and 52 are provided for each stage and the separate output terminals 60, 61, and 62 are also provided. The input terminal 53 of stage IV is also shown in FIG. 1.

Stage I is connected to stage II through a diode $D_1$, a storage capacitor 32, a second diode $D_2$, and the transistor $T_4$. Stage I is also coupled to the preceding stage, if there is a preceding stage, through diode $D_1$, capacitor 32, a diode $D_3$, a transistor $T_7$ and the line 110. Transistor $T_4$ has its collector connected to diode $D_2$ and its emitter connected to the input of stage II. The base of transistor $T_4$ is coupled to forward line 101 through a diode $D_{16}$ and a resistor 12. Transistor $T_7$ has its collector connected to diode $D_3$ and its emitter connected to the input of a preceding stage via the line 110, if a preceding stage is provided. The base of transistor $T_7$ is connected to reverse line 102 through diode $D_{17}$ and resistor 13. If stage I is, in fact, the first stage in the register, then transistor $T_7$, diode $D_3$, and, of course, the base circuit components are not necessary. That is, the reverse signal transfer circuitry is not necessary and can be eliminated in the first stage of the register since there is no preceding stage to which a reverse shift can be made. However, in order to provide a discharge path for capacitor 32, the resistor 81 is connected between the emitter of transistor $T_7$ and common potential line 103.

In stage II the input circuitry in addition to input terminal 51 includes the resistors 14 and 15 and the capacitor 36. The gate input of $SCR_2$ is connected to the junction of these three components. Forward signal transfer transistor $T_5$ has its collector coupled to the cathode of $SCR_2$ through the diodes $D_4$ and $D_5$. Storage capacitor 33 is connected between line 103 and the common terminal of diodes $D_4$ and $D_5$. The emitter of transistor $T_5$ is connected to the input of stage III and the base of this transistor is coupled to forward line 101 through the diode $D_{18}$ and the resistor 19. Reverse signal tranSfer transistor $T_8$ has its collector coupled to the common junction of diodes $D_4$ and $D_5$ through a diode $D_6$ and its emitter connected to input terminal 50 of stage I via a line 111. The base of transistor $T_8$ is coupled to reverse line 102 through a diode $D_{19}$ and a resistor 20.

The input circuit of stage III comprises input terminal 52, the resistors 21 and 22 and the capacitor 37. The gate electrode of $SCR_3$ is connected to the common junction of resistors 21 and 22 and capacitor 37. Forward signal transfer transistor $T_6$ has its collector coupled to the cathode of $SCR_3$ through the diodes $D_7$ and $D_8$ and its emitter electrode connected to the input circuit of stage IV. Resistor 80 is connected between the emitter of transistor $T_6$ and common potential line 103 to provide a discharge path for capacitor 34 since stage III is the last stage of the register. The storage capacitor 34 is connected between line 103 and the common junction of diodes $D_7$ and $D_8$. The base of transistor $T_6$ is coupled to forward line 101 through diode $D_{20}$ and resistor 26. Reverse signal transfer transistor $T_9$ has its collector coupled to the common junction of diodes $D_7$ and $D_8$ through diode $D_9$ and its emitter electrode connected to the input of stage II via the line 112. The base of transistor $T_9$ is coupled to reverse line 102 through a diode $D_1$ and a resistor 27. As has been mentioned above, only the input circuit of stage IV is shown in FIG. 1. This input circuit is made up of input terminal 53, the resistors 28 and 29 and the capacitor 38.

A capacitor 83 is connected between 20 volt line 100 and common potential line 103. Capacitor 83 is a filter capacitor. Capacitor 83 is not part of the register circuit and is not absolutely necessary for proper operation of the register. However, the use of a filter capacitor in this instance represents good engineering practice and in some applications of the register is actually needed for trouble free operation.

An input signal circuit that can be used to provide a signal to the input terminals 50–53 is shown connected to input terminal 50. This input circuit comprises a diode $D_{16}$, a capacitor 30 and a switch $SW_3$. Switch $SW_3$ has one terminal connected to the common point of diode $D_{16}$ and capacitor 30 and its other terminal connected to 20 volt line 100. In addition to switch $SW_3$, a shift switch $SW_1$ and a select switch $SW_2$ are also part of the circuitry of FIG. 1. Shift switch $SW_1$ has one terminal connected to 20 volt line 100 and its other terminal connected to the arm of select switch $SW_2$. Select switch $SW_2$ may, for example, be a toggle switch having one terminal or switch position connected to forward line 101 and a second terminal or a second switch position connected to reverse line 102. The input signal circuitry consisting of switch $SW_3$, diode $D_6$, and capacitor 30 is given by way of example only. Input signals can be applied to input terminals 50 to 53 from any suitable signal source through appropriate conventional coupling circuitry. Similarly, the switching arrangement consisting of shift switch $SW_1$ and select switch $SW_2$ can be replaced by any other suitable switching arrangement.

The circuitry of FIG. 1 except for the reverse signal transfer circuits, switch $SW_2$ and some of the diodes is essentially identical to the circuit shown in FIG. 1 of my said copending application. In other words, the forward and reverse shift register of this invention is essentially a modification of the forward register disclosed in my said copending application.

One other difference between the circuit of FIG. 1 of my said copending application and the FIG. 1 circuit of this application that should probably be noted is the difference in the base circuitry of the transfer transistors in the two circuits. The base circuit of each of the transfer transistors $T_4$, $T_5$, and $T_6$ in FIG. 1 of this application comprises a resistor and diode connected in series whereas the base circuit of each of the transfer transistors of FIG. 1 of my said copending application comprises a resistor and capacitor connected in series. Either of the two circuits can be used in both of the FIG. 1 circuits, however, the diode configuration is preferable.

Now that the circuit components have been described in detail, the operation of the circuitry will be described. Assume that initially all SCRs are nonconducting and that the shift register is in an "off" state. Also assume that switch $SW_2$ is closed on forward line 101 as shown by the solid line and arrow in FIG. 1. The dotted line and arrow merely indicate that the switch can be switched between lines 101 and 102. When switch $SW_2$ is closed on forward line 101, the register is in the forward mode of operation as will be apparent later. Under these conditions, the switch $SW_1$ which is a normally closed switch is closed and transistors $T_1$, $T_2$, and $T_3$ are conducting because a voltage is applied to the base electrodes of these transistors from forward line 101 through the series connected diode resistor combinations connecting the base electrodes to line 101. If switch $SW_3$ is now closed momentarily, an input pulse will be applied to the gate electrode of $SCR_1$, thereby gating on $SCR_1$. Lamp 40 will now be on indicating that $SCR_1$ is conducting. Conduction during this period of time is through the collector emitter electrodes of transistor $T_1$ because this transistor is in a conducting state as long as switch $SW_1$ is closed. If switch $SW_1$ is now opened, transistor $T_1$ will be cut off and capacitor 32 will be charged through diode $D_1$. Even though there is no longer any input at input terminal 50, because switch $SW_3$ was closed only momentarily. $SCR_1$ will remain conducting to charge capacitor 32. $SCR_1$ will continue to conduct until the current through the SCR is insufficient to maintain conduction. Although mentioned in my said copending application, it should be noted herein that I have found that the charge on capacitor 32 can be increased by connecting resistor 8 between the gate and cathode of $SCR_1$ rather than between gate and line 103 (which may be ground) as is the case in FIG. 1. Circuits using silicon controlled rectifiers conventionally do have a resistor connected between the gate and cathode of the SCR. Thus, the resistors 8, 15 and 22 could be connected between the gate and cathode electrodes of $SCR_1$, $SCR_2$, and $SCR_3$ respectively, rather than between gate and ground. However, even though this type of connection affords more positive shift from stage to stage because the SCR remains on longer thereby providing more time to build up a charge on the storage capacitor, I prefer to connect the resistors 8, 15, and 22 as shown in FIG. 1 because I believe this connection provides for a more noise-immune circuit. Lamp 40 which was turned on by the conduction of $SCR_1$ will, of course, turn off as soon as $SCR_1$ turns off.

During this period of time, transistor $T_4$ is non-conducting because there is no base drive. If switch $SW_1$ is now closed and switch $SW_2$ is closed on forward line 101 as initially assumed, transistor $T_4$ will begin to conduct because a pulse is applied to its base through resistor 12 and diode $D_{16}$. When transistor $T_4$ is conducting, capacitor 32 will discharge through this transistor; thereby, placing an input signal through resistor 14 on the gate electrode of $SCR_2$. Rectifier $SCR_2$ is now gated on and lamp 41 is ignited, indicating that this stage is now conducting. During this time, transistor $T_2$ is also conducting since switch $SW_1$ is closed and switch $SW_2$ is closed on line 101 thereby placing a voltage on the base of transistor $T_2$ through diode 13 and resistor 16.

If switch $SW_1$ is again opened, transistor $T_2$ will be rendered nonconducting and capacitor 33 will be charged through diode $D_4$. Capacitor 33 is charged until $SCR_2$ turns off. If Switch $SW_1$ is again closed, transistor $T_5$ will conduct; capacitor 33 will discharge through transistor $T_5$ and rectifier $SCRR_3$ will be gated on. As long as switch $SW_2$ remains closed on forward line 101, this operation will continue sequentially in the manner described all the way down the chain. If stage III is the last stage in the register then the emitter of transistor $T_6$ would merely be left hanging were it not connected to resistor 80. Without resistor 80 or some equivalent circuitry it is obvious that a signal could be trapped in storage capacitor 34. This trapped signal would cause improper operation and must be eliminated. Resistor 80 provides the discharge path for capacitor 34 thereby eliminating the signal that would otherwise be trapped.

Assume that instead of continuing from stage III to stage IV in a forward direction, one desires to shift from stage III back to stage II. Under these conditions switch $SW_1$ which is now closed will be opened thereby cutting off transistor $T_3$ and charging capacitor 34 through diode $D_7$. Capacitor 34 will be charged until $SCR_3$ cuts off. Lamp 42 which was ignited while $SCR_3$ conducted will now be extinguished.

Switch $SW_2$ is now transferred from line 101 to reverse line 102. If switch $SW_1$ which is open is now closed, transistor $T_9$ will be turned on because a voltage is applied to its base from line 102 through resistor 27 and diode $D_{21}$. When transistor $T_9$ is turned on, capacitor 34 will discharge through diode $D_{34}$ and transistor $T_9$ and an input signal will be applied to the input of stage II via line 112. This input signal is applied to the gate of $SCR_2$ and turns on this SCR. If now switch $SW_1$ is again opened, transistor $T_2$ will be cut off and capacitor 33 will be charged until $SCR_2$ cuts off. If switch $SW_2$ remains closed on reverse line 102 and switch $SW_1$ is again closed, capacitor 33 will be discharged through diode $D_6$ and transistor $T_8$ thereby applying an input signal to the input of stage I via line 111. As long as switch $SW_2$ remains closed on line 102, this reverse switching will continue sequentially from stage to stage in a reverse direction. If stage I is the first stage, then, as has been mentioned above, the reverse switching will end at stage I. Resistor 81 which is connected between the emitter of transistor $T_7$ and common potential line 103 prevents the occurrence of a trapped signal in storage capacitor 32 of the first stage. When shifting in the reverse direction, it is obvious that a signal could be trapped in capacitor 32 if the emitter of transistor $T_7$ were left unconnected. This trapped signal could, of course, create problems. Resistor 81 provides a discharge path for this signal that would otherwise be trapped in capacitor 32 in the reverse mode of operation. Thus, the function of resistor 81 is the same in the reverse direction as the function of resistor 81 in the forward direction.

While the function of the various diodes has not been specifically discussed, it should be apparent from the description of the operation that these diodes serve as blocking or isolation devices. For example, diode $D_{10}$ isolates line 102 from line 101 and similarly diode $D_{11}$ isolates line 101 from line 102. Also, diode $D_1$ blocks the discharge of capacitor 32 through transistor $T_1$. In a similar fashion diode $D_2$ prevents the charging of capacitor 32 through the base collector circuit of transistor $T_4$. Of course, in the other stages the equivalent diodes perform the equivalent functions. Thus, it is apparent that these diodes provide the necessary isolation and blocking functions for the circuits to operate in the proper manner.

From the foregoing description of the operation, it is quite apparent that the circuitry of FIG. 1 provides selective forward and reverse shifting. The direction of shift can be changed at any point in the chain by merely closing switch $SW_2$ on either forward line 101 or reverse line 102. It should also be apparent that by changing some of the basic forward and reverse interconnections that a plurality of shifting arrangements other than the straight serial forward or reverse shifting can be obtained. For example, stage III could be coupled back to stage I in a reverse direction rather than directly back to stage II. In a similar fashion, stage I could be connected in a forward direction to stage III rather than stage II. Thus, it is obvious that the circuitry of FIG. 1 provides an extremely versatile device for such things as machine control or industrial process control.

As has been mentioned above, my said copending application discloses various special output circuits and a cancel circuit. The output circuits and the cancel circuit disclosed in that application can also be utilized with the FIG. 1 circuitry of this application.

Figures 2, 4:
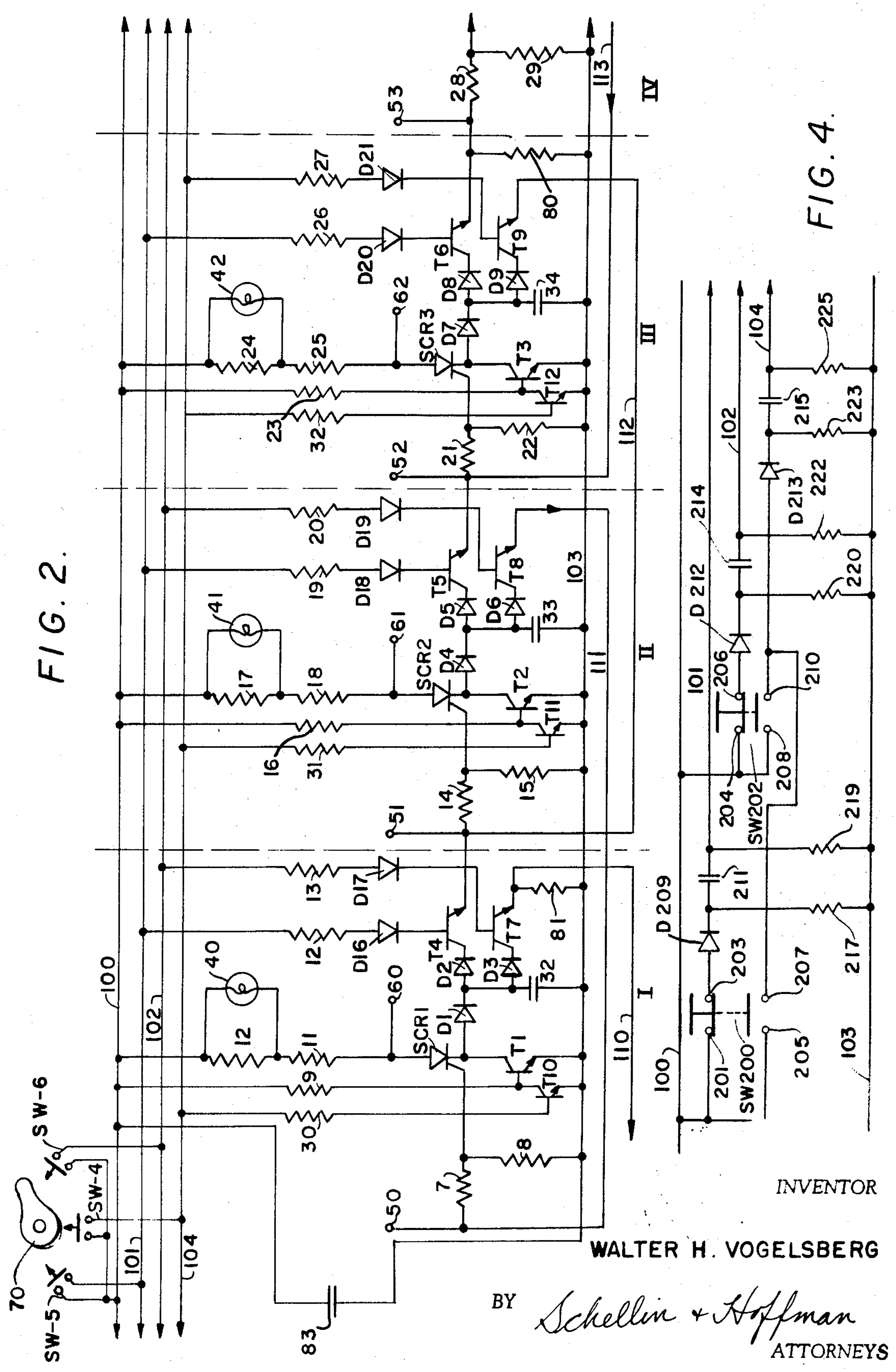
FIG. 2 is a schematic diagram showing a second embodiment of the shift register, a shifter circuit that may be used with this embodiment.
FIG. 4 is a schematic diagram showing a shifter circuit that can be used with the shift registers of FIG. 2 and 3.

The circuitry shown in FIG. 2 is a modification of the circuitry shown in FIG. 1. The like parts in the two figures have like numbers. In the FIG. 2 circuitry an additional switching transistor has been added to each stage and a different switching arrangement is utilized. The additional transistors are the transistor $T_{10}$ in stage I, the transistor $T_{11}$ in stage II, the the transistor $T_{12}$ in stage III. As is the case in the FIG. 1 circuit, resistors 80 and 81 are used in the FIG. 2 circuit to prevent trapped signals and filter capacitor 83 is connected between 20 volt line 100 and common potential line 103.

The switching arrangement in this circuit comprises a normally open switch $SW_4$, a forward shift switch $SW_5$, a reverse shift switch $SW_6$ and a cam actuator 70. With this switching arrangement an additional line 104 is required. As was the case in FIG. 1, line 100 is a 20 volt supply line, line 101 is the forward shift line and line 102 is the reverse shift line. Line 103 at the bottom of the circuitry is a common potential line.

In addition to the differences between FIG. 1 and FIG. 2 mentioned above, the diodes in the base circuit of the switching transistors of FIG. 1 are eliminated in the FIG. 2 circuitry. These diodes are no longer necessary since two switching transistors are provided in each stage and neither of these transistors has its base connected to the forward and reverse shift lines. Also, the capacitor shown in the input circuits of FIG. 1 are not shown in the input circuits of FIG. 2. The type of input circuit used is not critical. Therefore, any suitable input circuitry can be utilized in either the FIG. 1 or FIG. 2 circuits. In fact, under certain conditions it may be desirable to provide special input circuitry.

While the circuitry of FIG. 2 is a modification of the FIG. 1 circuitry and the differences are those mentioned above, a detailed description of this circuit will be given since I have found that this circuit provides greater noise immunity than the circuitry of FIG. 1 and is therefore preferable to the circuitry of FIG. 1 in many industrial applications. As was the case in FIG. 1, three complete stages, stages I, II, and III and a part of a fourth stage, stage IV, is shown in FIG. 2. Each stage comprises an input circuit, a switching circuit, a silicon controlled rectifier, a storage capacitor, a forward signal transfer circuit and a reverse signal transfer circuit. Referring now to stage I, the input circuit comprises transistors 7 and 8 and the switching circuit comprises the transistors $T_1$ and $T_{10}$. Transistor $T_{10}$ has its base coupled to line 104 through a resistor 30. The emitter of this transistor and the emitter of transistor $T_1$ are both connected to common potential line 103. The collector of transistor $T_{10}$ is connected directly to the base of transistor $T_1$ and resistor 9 is connected between 20 volt line 100 and the common point of the collector of transistor $T_{10}$ and the base of transistor $T_1$. The collector of transistor $T_1$ is connected to he cathode of $SCR_1$ which is the single SCR of this stage. The gate electrode of $SCR_1$ is connected to the common point of resistors 7 and 8. An output terminal 60 is provided at the anode of $SCR_1$. The anode of $SCR_1$ is coupled to 20 volt line 100 through serially connected resistors 11 and 12. An indicator lamp 40 is connected across resistor 12. Storage capacitor 32 has one terminal coupled to the chode of $SCR_1$ through diode $D_1$ and its other terminal connected directly to common potential line 103. Forward signal transfer transistor $T_4$ has its collector coupled to storage capacitor 32 through diode $D_2$, its base coupled to forward shift line 101 through serially connected diode $D_{16}$ and resistor 12 and its emitter connected to the input circuit of stage II. Reverse signal transfer transistor $T_7$ has its collector coupled to storage capacitor 32 through diode $D_3$, its base connected to reverse shift line 102 through serially connected diode $D_{17}$ and resistor 13 and its emitter connected to reverse line 110. Line 110 would be connected to the input of the stage preceding stage I if such a preceding stage were provided. The remaining stages in the circuit of FIG. 2 are identical to stage I and the various components in stage II are interconnected in the same manner as the components of stage I. If more than three stages are to be provided, stage IV would first be completed and then any number of stages can be added to the chain. If stage IV were completed, line 113 would be connected to the emitter of the reverse transfer transistor in stage IV.

Now that the circuitry of FIG. 2 has been described in detail, its operation will be described. Assume that switches $SW_4$, $SW_5$, and $SW_6$ are open and that all the stages are off. Under these conditions, transistors $T_1$, $T_2$, and $T_3$ are conducting since their bases are connected to 20 volt line 100 through their respective coupling resistors. If now an input signal is applied to terminal 50, $SCR_1$ will be turned on. During this period of time conduction of $SCR_1$ is through transistor $T_1$. It should be noted at this point that the input signal circuitry shown in FIG. 1 is not shown in FIG. 2. As was mentioned above with respect to FIG. 1, any suitable input signal circuitry can be utilized to provide an input signal to the input terminals of each stage. Therefore, the input signal circuitry of FIG. 1 or any other circuitry could be coupled to terminal 50.

If now cam 70 closes normally open switch $SW_4$, a voltage will be applied to the base of transistor $T_{10}$ and this transistor will conduct. When transistor $T_{10}$ conducts, transistor $T_1$ is cut off because its base is now clamped to line 103 through transistor $T_{10}$. When transistor $T_1$ is cut off, storage capacitor 32 is charged through $SCR_1$. Storage capacitor 32 is charged until $SCR_1$ cuts off. When $SCR_1$ cuts off lamp 40 is extinguished and the charge remains stored on capacitor 32 since there is no path through which this capacitor can discharge at this point in time. If now cam 70 closes forward shift switch $SW_5$, transistor $T_4$ will conduct because a voltage is applied to its base when switch $SW_5$ is closed. When transistor $T_4$ conducts, capacitor 32 is discharged through this transistor and an input voltage is applied to the gate of $SCR_2$ in stage II through the input circuitry of stage II. $SCR_2$ conducts through transistor $T_2$ at this point in time since switch $SW_4$, which is a normally open switch, is open when switch $SW_5$ is closed. If switch $SW_4$ is again closed, transistor $T_{11}$ will be turned on and transistor $T_2$ will be cut off because its base is clamped to common potential line 103 through transistor $T_{11}$. When transistor $T_2$ is cut off, capacitor 33 is charged through $SCR_2$. As was the case with capacitor 32, capacitor 33 will be charged until $SCR_2$ cuts off. Of course, when $SCR_2$ was turned on lamp 41 was also turned on and remained on until $SCR_2$ was cut off. If now again cam 70 closes forward shift Switch $SW_5$, a voltage will be applied to the base of transistor $T_5$ and this transistor will be turned on. When transistor $T_5$ conducts, capacitor 33 is discharged through this transistor and an input signal is applied to the gate electrode of $SCR_3$. Conduction of $SCR_3$ during this period of time is through transistor $T_3$ since switch $SW_4$ is open. If switch $SW_5$ is closed again, transistor $T_{12}$ will be turned on thereby cutting off transistor $T_3$. When transistor $T_3$ is cut off capacitor 34 is charged through $SCR_3$ until this SCR cuts off. If switch $SW_5$ is again closed, capacitor 34 will be discharged through transistor $T_6$ and an input signal will be applied to the gate electrode of the silicon controlled rectifier in stage IV. From the foregoing description, it is obvious that a signal can be continuously shifted down the chain in a forward direction by the sequential operation of switch $SW_4$ and $SW_5$ in the manner just described.

Now that forward shifting has been described, the reverse mode of shifting will be described. For this mode of operation assume that capacitor 34 of stage III is charged, that switches $SW_4$, $SW_5$, and $SW_6$ are open and that it is desired to shift in a reverse direction from stage III back to stage II. In order to shift in a reverse direction, switch $SW_6$ is closed thereby applying 20 volts to reverse shift line 102. When switch $SW_6$ is closed, transistor $T_9$ is rendered conductive. When transistor $T_9$ conducts, capacitor 34 discharges through diode $D_9$ and transistor $T_9$, thereby applying an input signal to terminal 51 of stage II via line 112. The input signal at terminal 51 is, of course, coupled to the gate electrode of $SCR_2$ through resistor 14 and $SCR_2$ is turned on. During this time, transistor $T_2$ is conducting because normally open switch $SW_4$ is open. $SW_4$ is now closed thereby rendering transistor $T_{11}$ conductive and transistor $T_2$ non-conductive. Storage capacitor 33 is now charged through diode $D_4$ until $SCR_2$ cuts off. At this point in time all three switches are again open. If now it is desired to again shift in a reverse direction from stage II to stage I, switch $SW_6$ is again closed and transistor $T_8$ is rendered conductive. Storage capacitor 33 discharges through diode $D_6$ and conducting transistor $T_8$, thereby applying an input signal to input terminal 50 via line 111. The process just described is, of course, again repeated to charge storage capacitor 32. If stage I is the first stage of the register, then, of course, no further reverse shifting can be accomplished. If, however, one or more stages precede stage I, reverse shifting takes place through diode $D_3$, transistor $T_7$, and the emitter of transistor $T_7$ would be connected through line 110 to the input terminal of the preceding stage. The line 113 is the line that would be connected to the reverse signal transfer transistor of stage IV if this stage were completed.

As was mentioned above with reference to FIG. 1, the circuitry of FIG. 2 is not limited to serial forward and reverse shifting. Any combination of forward and reverse shifting desired can be obtained by the proper manipulation of the forward and reverse switches $SW_5$ and $SW_6$ respectively. In addition, by interconnecting input terminals 51 through 53 and the transfer transistors $T_4$ through $T_9$, various combinations of forward and reverse sequences can be obtained. In addition, the special output and cancel circuit disclosed in my said copending application can also be used with this circuit.

Figures 3, 5:
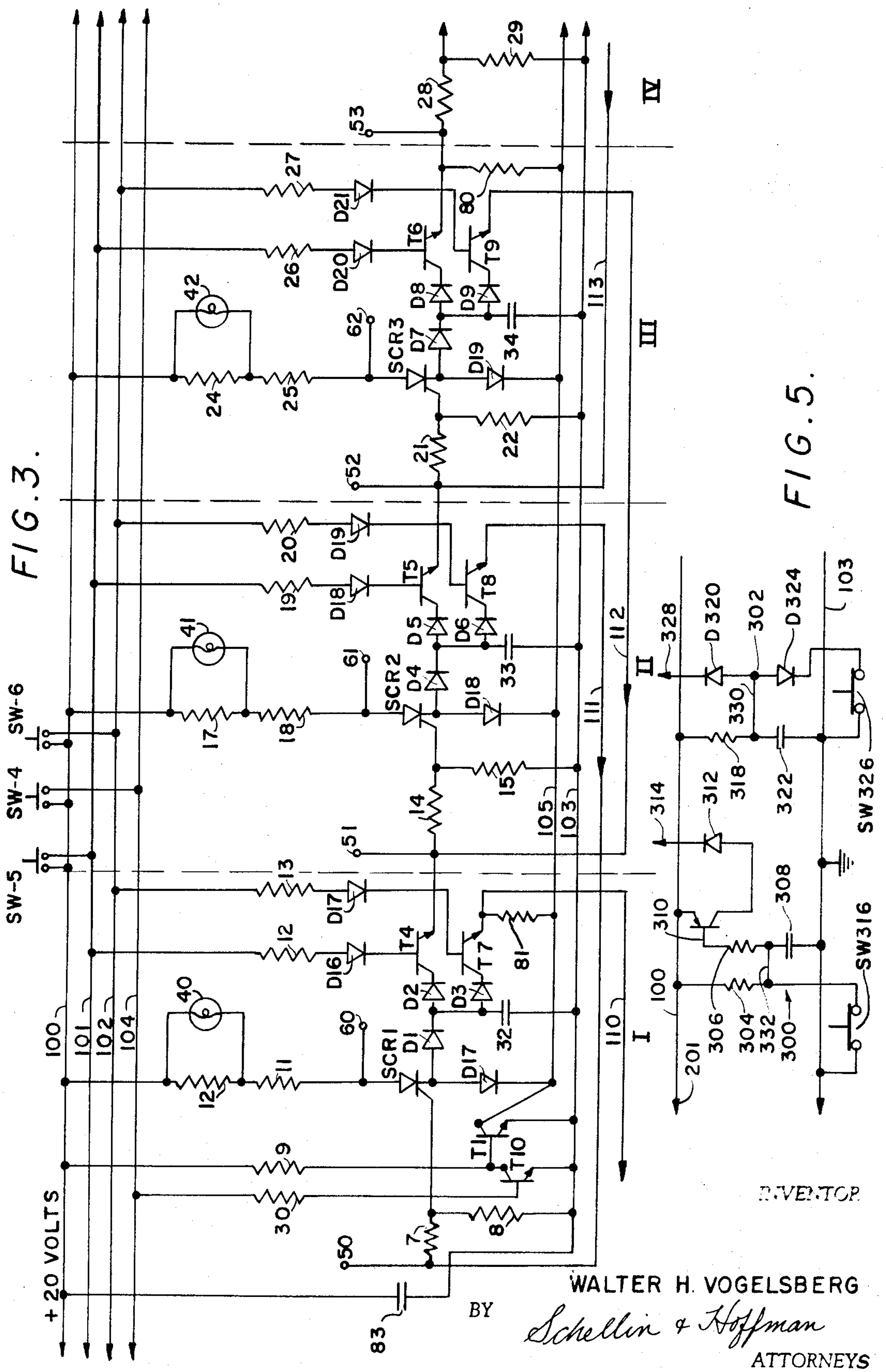
FIG. 3 shows a variation of the circuitry shown in FIG. 2.
FIG. 5 is a circuit diagram of an input circuit that can be used with the shift registers of FIG. 1–3.

The circuit shown in FIG. 3 is a modification of the circuit shown in FIG. 2. In FIG. 3 transistors $T_2$, $T_3$, $T_{11}$ and $T_{12}$ of the FIG. 2 circuit have been eliminated. Only transistors $T_1$ and $T_{10}$ remain. Again, three complete stages, stages I, II and III and a partial fourth stage, IV, are shown. In this circuit the collector electrode of transistor $T_1$ is connected to the cathode of all the SCRs through the separate diodes $D_{17}$ through $D_{19}$. The cathode of $D_{17}$ is connected to the collector of transistor $T_1$ and its anode is connected to the cathode of $SCR_1$. In stage II the anode of diode $D_{18}$ is connected to the cathode of $SCR_2$ and its cathode is coupled to the collector of transistor $T_1$ through line 105. Similarly, diode $D_{19}$ of stage III has its anode connected to the cathode of $SCR_3$ and its cathode coupled to the collector of transistor $T_1$ through line 105. Except for the deletion of transistors $T_2$, $T_3$, $T_{11}$ and $T_{12}$ and the addition of diodes $D_{17}$ through $D_{19}$ and the manner in which these diodes are connected in the circuit, the circuit of FIG. 3 is identical to the circuit of FIG. 2. Note, however, that cam 70 of FIG. 2 is not shown in FIG. 3. Of course, cam 70 or any other suitable means can be utilized to operate switches $SW_4$, $SW_5$ and $SW_6$ of FIG. 3. As before, additional stages can be added to the circuit of FIG. 4 by completing stage IV and adding as many additional stages identical to the stages I, II, and III as desired.

In the circuit of FIG. 3 the transistors $T_1$ and $T_{10}$ operate in the same manner as they do in the circuit of FIG. 2. However, now transistors $T_1$ and $T_{10}$ control the charging of the storage capacitors of all the stages. With this circuit arrangement, a pair of transistors for each stage is not necessary. This, or course, simplifies the circuit considerably. Thus, the circuit of FIG. 3 is more economical and is more easily constructed in a compact manner.

Briefly, the circuit of FIG. 3 operates as follows: Assume that switches $SW_4$, $SW_5$ and $SW_6$ are all open and that all the stages are nonconducting. Under these conditions, transistor $T_1$ is conducting and transistor $T_{10}$ is nonconducting. If now an input signal is applied to input terminal 50, $SCR_1$ will be gated on and this SCR will conduct through diode $D_{17}$ and transistor $T_1$. Normally open switch $SW_4$ is now closed and transistor $T_{10}$ is turned on. As was the case in FIG. 2, transistor $T_1$ is cut off when transistor $T_{10}$ is conducting because the base of transistor $T_1$ is clamped to common potential line 103 when transistor $T_{10}$ conducts. When transistor $T_1$ is cut off, $SCR_1$ conducts through diode $D_1$ and charges storage capacitor 32. Storage capacitor 32 is charged until $SCR_1$ cuts off. If now switch $SW_5$ is closed, transistor $T_4$ will be turned on, thereby discharging storage capacitor 32 and turning on $SCR_2$. At this point in time, all three switches are open and transistor $T_1$ is again conducting. Therefore, the conduction of $SCR_2$ is through diode $D_{18}$ and transistor $T_1$. Again, normally open switch $SW_4$ is closed to turn off transistor $T_1$ thereby charging storage capacitor 33. This operation of opening and closing of the switches $SW_4$ and $SW_5$ is repeated to shift the signal down the chain. As was the case in the circuit of FIG. 2, a reverse shift is obtained by the use of switch $SW_6$. Switch $SW_6$ controls the conduction of the reverse signal transfer transistors $T_7$, $T_8$, and $T_9$. With this circuit as is the case with the circuits of FIGS. 1 and 2, any combination of forward and reverse shifting desired can be obtained by the proper sequencing of the operation of switches $SW_4$, $SW_5$, and $SW_6$ and the output circuits and cancel circuits disclosed in my said copending application can also be used with this circuit.

Referring again to the cam switch shown in FIG. 2, this switching arrangement provides rotational sensing to the shift register. If $SCR_1$ is conducting and can 70 is rotating clockwise, when $SW_4$ is closed capacitor 32 will be charged and $SCR_1$ will cut-off. When $SW_5$ is closed the signal in capacitor 32 will be transferred to stage II. Cam 70 now continues to rotate and closes switch $SW_6$, the closing of $SW_6$ has no effect on the register. Thus forward shifting occurs when cam 70 rotates clockwise. For reverse shifting cam 70 rotates counterclockwise and the closing of switch $SW_5$ during this counter rotation has no effect on the register. The registers of FIGS. 2 and 3, can, of course, be operated by shifter circuits other than the cam arrangement of FIG. 2. Another shifter circuit that may be used with the registers of FIGS. 2 and 3 but not with the register of FIG. 1 is shown in FIG. 4.

As shown in FIG. 4, the switching circuit comprises a first switch $SW_{200}$ and a second switch $SW_{202}$. As is the case in FIGS. 2 and 3, the line 100 is the 20 volt line; the line 101 is the forward shift line; the line 102 is the reverse shift line; the line 103 is the common potential line and the line 104 is the normally open line.

Switch $SW_{200}$ which is a double pole double throw switch has an upper pair of contacts 201 and 203 and a lower pair of contacts 205 and 207. Contact 201 is connected directly to 20 volt line 100 and contact 203 is coupled to forward line 101 through a diode $D_{209}$ and a capacitor 211. Contact 205 is directly connected to 20 volt line 100 and contact 207 is coupled to normally open line 104 through a diode $D_{213}$ and a capacitor 215.

Switch $SW_{202}$ which is also a double pole double throw switch has an upper pair of contacts 204 and 206 and a lower pair of contacts 208 and 210. Contact 204 is directly connected to 20 volt line 100 and contact 206 is coupled to reverse line 102 through diode $D_{212}$ and a capacitor 214. Contact 208 is directly connected to 20 volt line 100 and contact 210 is coupled to normally open line 104 through diode $D_{213}$ and capacitor 215.

A resistor 217 is connected between common potential line 103 and the common point of diode $D_{209}$ and capacitor 211. A resistor 219 is connected between forward line 101 and common potential line 103. Similarly a resistor 220 is connected between common potential line 103 and the common point of diode $D_{212}$ and capacitor 214, and a resistor 222 is connected between reverse line 102 and common potential line 103. A third pair of resistors is similarly connected in the circuit of normally open line 101. That is, a resistor 223 is connected between common potential line 103 and the common point of diode $D_{213}$ and capacitor 215, and a resistor 225 is connected between common potential line 103 and normally open line 104. The function of the diode, capacitor and pair of resistors coupled to each of the lines 101, 102 and 104 will become apparent from the following description of the operation of the shifter circuit.

Assume that the shifter circuit of FIG. 4 is connected to the shift register of FIG. 2 in place of the shift switch arrangement shown in FIG. 2, that shifting is to be in the forward direction and that an input pulse has been applied to input terminal 50 of FIG. 2. Under these condictions transistor $T_1$ is conducting and $SCR_1$ is conducting. The conduction of $SCR_1$ at this time is through transistor $T_1$. If switch $SW_{200}$ is now closed on contacts 205 and 207, a pulse will be applied on line 104 thereby turning on transistor $T_{10}$ which in turn cuts off transistor $T_1$. $SCR_1$ will now conduct through diode $D_1$ and charge capacitor 32. When capacitor 32 is charged $SCR_1$ cuts off. If switch $SW_{200}$ is now closed on normally closed contacts 201 and 203 a pulse will be applied to forward line 101 thereby turning on transistor $T_4$ and discharging capacitor 32 through transistor $T_4$. When capacitor 32 discharges through transistor $T_4$, $SCR_2$ is turned on. In order to shift from stage II to stage III the process of closing switch $SW_{200}$ on contacts 205 and 207 and then reclosing the switch on contacts 201 and 203 is repeated. This process is, of course, repeated each time the signal is shifted to the next following stage.

If reverse shifting is desired switch $SW_{202}$ is utilized. Assume that the signal has just been shifted out of stage I in FIG. 2 as described above in the forward mode of operation. Recall that switch $SW_{200}$ was reclosed on contacts 201 and 203 thereby turning on $SCR_2$ and of course, transistor $T_2$ is also now conducting. If switch $SW_{202}$ is now closed on contacts 208 and 210, transistor $T_2$ will be cut off and capacitor 33 will be charged until $SCR_2$ cuts off. To shift for stage II back to stage I, switch $SW_{202}$ is now reclosed on contacts 204 and 206 thereby turning on transistor $T_8$ and discharging capacitor 33 through transistor $T_8$. Since the emitter of transistor $T_8$ is connected to the input of stage I, $SCR_1$ will be turned on when capacitor 33 is discharged through transistor $T_8$. From the foregoing it is obvious that reverse shifting from stage to stage is accomplished by manipulating switch $SW_{202}$ in the manner just described.

Note that switches $SW_{200}$ and $SW_{202}$ remain normally closed on contacts 201 and 203 and contacts 204 and 206 respectively. When either of these switches are returned from their normally open contacts to their normally closed contacts a pulse is initially applied to the forward or reverse lines 101 and 102 depending upon which switch is operated. It is this initial pulse that operates the shift register. Similarly, a pulse is initially applied to normally open line 104 each time either of the switches is closed on its normally open contacts and it is this pulse that operates the shift register. The diodes and RC circuit in each of the lines 101, 102 and 104 form these pulses and are therefore in effect pulsing circuits. Also, as is probably obvious, the resistors connected on both sides of each capacitor and to common potential line 103 provide a discharge path for the capacitors when the associated switch terminal is opened.

FIG. 5 shows special input circuits that can be used with the shift registers of FIGS. 1, 2, and 3. While as has been mentioned any suitable input circuit can be used to apply input signals to any of the input terminals of the shift registers, special input circuits may be required to obtain particular input information. FIG. 5 is a schematic diagram of two such special input circuits. These input circuits provide "not ground" and "ground" input information.

FIG. 5 shows one "ground" input circuit 300 and one "not ground" input circuit 302. Any number of either or both of these circuits may be used. Any additional circuits used would be similar to the two circuits shown in FIG. 5.

The ground input circuit comprises a resistor 304, a second resistor 306, a capacitor 308, a transistor 310, a diode $D_{312}$, an output lead 314 and a switch $SW_{316}$. Resistor 304 is connected between 20 volt line 100 and one terminal of switch $SW_{316}$. The other terminal of switch $SW_{316}$ is connected to common potential line 103 which in this case is ground. Resistor 306 and capacitor 308 are connected in series between the base of transistor 310 and ground 103. The emitter of transistor 310 is connected directly to 20 volt line 100 and the collector of transistor 310 is coupled to an output lead 314 through diode $D_{312}$. The common point of resistor 306 and capacitor 308 is connected to resistor 304 by means of conductor 332. Note that while the positive voltage source is shown as the 20 volt source of the shift register, input circuit 300 and input circuit 302 can be connected between any positive voltage source and ground. The shift register source would, of course, be a convenient source.

Not ground input circuit 302 comprises a resistor 318, a diode $D_{320}$, a capacitor 322, a diode $D_{324}$, a switch $SW_{326}$, and an output lead 328. Resistor 318 and capacitor 322 are connected in series between 20 volt line 100 and ground 103. Oppositely poled diodes $D_{320}$ and $D_{324}$ are connected in series between output lead 328 and one terminal of switch $SW_{326}$. The other terminal of switch $SW_{326}$ is connected to ground 103. The common point of resistor 318 and capacitor 322 is connected to the common point of diodes $D_{320}$ and $D_{324}$.

Output lead 314 is connected to the input of one of the stages of the shift register. The stage to which this lead is connected is to respond to ground input signals. If other stages of the register are to respond to ground input signals, a circuit identical to ground input circuit 300 would be connected to the input of each such stage. Similarly, output lead 328 is connected to the input of one stage of the register. This stage of the register is to respond to not ground input signals. If other stages of the register are to respond to not ground input signals, a circuit identical to not ground circuit 302 would be connected to the input of each such stage.

The terms not ground and ground input signals are derived from the manner in which circuits 300 and 302 provide input signals to the shift register. Switch $SW_{326}$ is normally closed on ground 103. When switch $SW_{326}$ is opened an output signal is generated and this signal is applied to the input of the stage of the register to which lead 328 is connected. Thus, an output is generated by circuit 302 when switch $SW_{326}$ is not connected to ground.

The reverse situation exists with ground input circuit 300. Switch $SW_{316}$ is normally opened. When switch $SW_{316}$ is closed on ground 103, transistor 310 conducts and an output pulse appears on lead 314. This output pulse is applied to the input of the register to which lead 314 is connected. Thus, circuit 300 produces an input signal when switch $SW_{316}$ is grounded.

As has been mentioned above, modular construction techniques for constructing the shift register and ring counter of my said copending application are disclosed in that application The three circuits disclosed in this application can also be constructed in this manner. In other words, solid state printed circuit techniques can be utilized to fabricate the reverse and forward shift register circuits disclosed herein. Therefore, these circuits can be completely factory pre-wired in modular fashion and the forward and reverse register is ready, when it leaves the factory, to be connected to conventional strips or plugged into adapters depending upon the final construction design. Of course, printed circuit techniques can also be used to fabricate the switching and input circuits.

While my invention has been described with reference to specific embodiments, it will be obvious to those skilled in the art that various changes and modifications can be made to the embodiments disclosed without departing from the spirit and scope of the invention as defined in the claims. For example, the diode pairs shown associated with switch $SW_2$ and the switching transistors in FIG. 1 can obviously be replaced with a single pair of diodes and a common line connecting this single pair to all of the switching transistors.

Also, the various switches shown can be replaced by equivalent switching means. For example, independently operated single-pole single-throw switches could be used or where applicable single-pole double-throw switches could be used. In addition, the ground and not ground circuits could be operated from a common potential line that is not at ground level and would normally be so operated when the register common potential line is not at ground. In fact these circuits can be operated at any potential level that will produce the desired register inputs. In such a case line 103 of FIG. 5 would not be the same as line 103 of the shift registers.

What is claimed is:

1. A control circuit comprising: a plurality of cascaded stages, each stage including a silicon controlled rectifier having anode, cathode and gate electrodes; the anode of all of said silicon controlled rectifiers being coupled to a voltage source; the cathode electrode of each of said silicon controlled rectifiers being coupled through a first separate signal transfer means including an electronic switch to the input of a subsequent stage and through a second separate signal transfer means including an electronic switch to the input of a preceding stage; separate signal storage means coupled between a common potential point and the cathode electrode of each of said silicon controlled rectifiers, switching means coupled between a common potential point and the cathode electrodes of said silicon controlled rectifiers.

2. A control circuit as defined in claim 1 wherein selective voltage switching means are provided for selectively coupling said electronic switches of said first and second signal transfer means to said voltage source.

3. A control circuit as defined in claim 2 wherein said selective voltage switching means comprises: a first on-off switch having first and second terminals; means to couple said first terminal of said first switch to said voltage source; means to couple said second terminal of said first switch to all of said first separate signal transfer means; a second on-off switch having first and second terminals; means to connect said first terminal of said second switch to said voltage source; means to couple said second terminal of said second switch to all of said second separate signal transfer means; a third on-off switch having first and second terminals; means to connect said second terminal of said third on-off switch to said voltage source; and means to couple said switching means to said second terminal of said third on-off switch.

4. A control circuit as defined in claim 3 wherein said first, second and third on-off switches are selectively actuated by a cam.

5. A control circuit as defined in claim 2 wherein said selective voltage switching means comprises: a forward conductive line coupled to all of said first separate signal transfer means; a reverse conductive line coupled to all of said second separate signal transfer means; a normally open conductive line coupled to said switching means; a first double-pole double-throw switch having first, second, third and fourth terminals; means to connect said first terminal of said first double-pole double-throw switch to said voltage source; means to connect said third terminal of said first double-pole double-throw switch to said voltage source; a first series connected diode and capacitor coupled between said second terminal of said first double-pole double-throw switch and said forward conductive line; a second series connected diode and capacitor coupled between said normally open conductive line and said fourth terminal of said first double-pole double-throw switch; a second double-pole double-throw switch having first, second, third and fourth terminals; means to connect said first terminal of said second double-pole double-throw switch to said voltage source; means to connect said third terminal of said second double-pole double-throw switch to said voltage source; a third series connected diode and capacitor coupled between said second terminal of said second double-pole double-throw switch and said reverse conductive line; means to connect said fourth terminal of said second double-pole double-throw switch to said fourth terminal of said first double-pole double-throw switch; a first resistor connected between said common potential point and the common point of said first series connected diode and capacitor; a second resistor connected between said common potential point and said forward conductive line; a third resistor connected between said common potential point and the common point of said second series connected diode and capacitor; a fourth resistor connected between said common potential point and said normally open conductive line; a fifth resistor connected between said common potential point and the common point of said third series connected diode and resistor and a sixth resistor connected between said common potential point and said reverse conductive line.

6. A control circuit as defined in claim 1 wherein separate input signal circuit means are coupled to each of the gate electrodes of all of said silicon controlled rectifiers and separate output signal circuit means are coupled to each anode electrode of all of said silicon controlled rectifiers.

7. A control circuit as defined in claim 1 wherein a not ground input circuit is coupled to the gate electrode of one of said silicon controlled rectifiers and a ground input circuit is coupled to the gate electrode of another one of said silicon controlled rectifiers.

8. A control circuit as defined in claim 7 wherein said ground input circuit comprises: a switch having first and second terminals; a first resistor connected between said voltage source and the first terminal of said switch; means to connect the second terminal of said switch to said common potential point; a transistor having a base electrode, an emitter electrode and a collector electrode; means to connect said emitter electrode to said voltage source; a second resistor and a capacitor connected in series between said base electrode and said common potential point; a diode coupled between said collector electrode and the gate electrode of one of said silicon controlled rectifier and wherein said not ground input circuit comprises: a not ground switch having first and second terminals; a resistor and a capacitor connected in series between said voltage source and said common potential point; a pair of oppositely poled series connected diodes coupled between the gate electrode of one of said silicon controlled rectifiers and said first terminal of said not ground switch; and means for connecting said second terminal of said not ground switch to said common potential point.

9. A control circuit as defined in claim 8 wherein a plurality of said ground input circuits are provided, each of said ground input circuits having its collector electrode coupled to a different gate electrode of said silicon controlled rectifiers and wherein a plurality of said not ground circuits are provided, each of said not ground input circuits having its series connected diodes coupled to a different gate electrode of said silicon controlled rectifiers.

10. A control circuit as defined in claim 1 wherein each of said separate signal storage means comprises a capacitor.

11. A control circuit as defined in claim 2 wherein each of said first separate signal transfer means comprises a transistor having its collector coupled to the cathode electrode of the silicon controlled rectifier of one of said stages, its emitter coupled to the collector electrode of the silicon controlled rectifier of the subsequent stage and its base coupled to said selective voltage switching means.

12. A control circuit as defined in claim 11 wherein each of said second separate signal transfer means comprises a transistor having its collector electrode coupled to the cathode electrode of the silicon controlled rectifier of one of said stages, its emitter electrode coupled to the gate electrode of the silicon controlled rectifier of the preceding stage and its base coupled to said selective voltage switching means.

13. A control circuit as defined in claim 2 wherein said switching means comprises a plurality of circuits, one for each stage of said stages, each including a transistor having its emitter connected to a common potential point, its collector connected to the cathode electrode of the silicon controlled rectifier of the associated stage of said stages and its base electrode coupled to said selective voltage switching means.

14. A control circuit as defined in claim 2 wherein said switching means comprises a plurality of circuits, one for each stage of said stages, each including a first transistor having its base coupled to said selective voltage switching means, its emitter connected to a common potential point and its collector coupled to said voltage source; and a second transistor having its base connected to the collector of said first transistor, its emitter connected to a common point, and its collector connected to the cathode of the silicon controlled rectifier of the associated stage of said stages.

15. A control circuit as defined in claim 2 wherein said switching means comprises a first transistor having its emitter connected to a common potential point, its collector coupled to said voltage source and its base coupled to said selective voltage switching means; and a second transistor having its base connected to the collector of said first transistor, its emitter connected to a common potential point and its collector coupled to the cathodes of the silicon controlled rectifiers of all of said stages.

16. A control circuit as defined in claim 2 wherein said selective voltage switching means comprises: an on-off switch having first and second terminals; means to connect said first terminal to said voltage source; a two position switch having a switching arm, a first position terminal and a second position terminal; means to connect said second terminal of said on-off switch to said switching arm of said two position switch; means to couple all of said first separate signal transfer means to said first position terminal; means to couple all of said second separate signal transfer means to said second position terminal; and means to couple said switching means to both said first and second position terminals.

17. A control circuit as defined in claim 1 wherein a "not-ground" input circuit is coupled to the gate electrode of one of said silicon controlled rectifiers.

18. A control circuit as defined in claim 1 wherein a "-ground" input circuit is coupled to the gate electrode of one of said silicon controlled rectifiers.

19. A control circuit comprising a plurality of stages, each stage including a silicon controlled rectifier having cathode, anode, and gate electrodes and a first transistor having emitter, collector, and base electrodes; a voltage source; an on-off switch; a selective switch having two positions; means to couple the emitter electrodes of all of said first transistors to a common potential point; separate means for coupling the base electrodes of each of said first transistors to both positions of said selective switch; means to couple the collector electrode of said first transistors of each stage to the cathode electrode of the silicon controlled rectifier included in the same stage; a plurality of signal storage means; means to couple a different one of said plurality of signal storage means between a common potential point and the cathode electrodes of each of said silicon controlled rectifiers; a plurality of first signal transfer meanS each including an electronic switch; means to couple a different one of said plurality of first signal transfer means between the cathode electrode of each of said silicon controlled rectifiers and the gate electrode of the silicon controlled rectifier in the subsequent stage; a plurality of second signal transfer means each including an electronic switch; and means to couple a different one of said plurality of signal transfer means between the cathode electrode of each of said silicon controlled rectifiers and the gate electrode of the silicon controlled rectifier in the preceding stage.

20. A control circuit as defined in claim 19 wherein separate input signal circuit means are coupled to each of the gate electrodes of all of said silicon controlled rectifiers and separate output signal circuit means are coupled to each anode electrode of all of said silicon controlled rectifiers.

21. A control circuit as defined in claim 19 wherein each one of said plurality of signal storage means is a capacitor.

22. A control circuit as defined in claim 19 wherein each one of said plurality of first transfer means includes a transistor having a base electrode coupled to said first transmission line, a collector electrode coupled to the cathode electrode of the silicon controlled rectifier included in the same stage in which said transistor is located and an emitter electrode coupled to the gate electrode of the silicon controlled rectifier included in the stage subsequent to the stage in which said transistor is located; and wherein each one of said plurality of second signal transfer means includes a transistor having a base electrode coupled to said second transmission line, a collector electrode coupled to the cathode electrode of the silicon controlled rectifier included in the same stage in which said transistor is located and an emitter electrode coupled to the gate electrode of the silicon controlled rectifier included in the stage preceding the stage in which said transistor is located.

23. A control circuit as defined in claim 19 wherein a plurality of not ground input circuits are provided, each of said not ground input circuits being coupled to a gate electrode of a different one of said silicon controlled rectifiers and wherein a plurality of ground input circuits are provided, each of said ground input circuits being coupled to a gate electrode of a different one of said silicon controlled rectifiers.

24. A control circuit comprising: a plurality of stages, each stage including a silicon controlled rectifier having anode, cathode, and gate electrodes, a first transistor having emitter, collector, and base electrodes, and a second transistor having emitter, collector, and base electrodes; a voltage source; first, second, and third transmission lines selectively connected to said voltage source; means to couple the emitter electrode of said first transistor of all of said stages to a common potential point; means to couple the emitter electrode of said second transistors of all of said stages to said common potential point; separate resistive means connected between the base electrode of each of said second transistors of all of said stages and said third transmission line; means to couple the collector electrode of said second transistor of each of said stages to the base electrode of the first transistor in the same stage; separate resistive means for coupling the base electrode of said first transistor and the collector electrode of said second transistor of each of said stages to said voltage source; a plurality of signal storage means, means to connect one of said signal storage means between said point of common potential and the cathode of said silicon controlled rectifier of each of said stages; a plurality of first signal transfer means; means to couple a different one of said plurality of signal transfer means between the cathode electrode of said silicon controlled rectifier of each of said stages and the gate electrode of the silicon controlled rectifier of the subsequent stage; separate means to couple each of said first signal transfer means to said first transmission line; a plurality of second signal transfer means; means to couple a different one of said plurality of signal transfer means between the cathode electrode of said silicon controlled rectifier of each of said stages and the gate electrode of the silicon controlled rectifier of the preceding stage; and separate means to couple each of said second signal transfer means to said second transmission line.

25. A control circuit as defined in claim 24 wherein separate input signal circuit means are coupled to each of the gate electrodes of all of said silicon controlled rectifiers and separate output signal circuit means are coupled to each anode electrode of all of said silicon controlled rectifiers.

26. A control circuit as defined in claim 24 wherein each one of said plurality of signal storage means is a capacitor.

27. A control circuit as defined in claim 24 wherein each one of said plurality of first signal transfer means includes a transistor having a base electrode coupled to said first transmission line, a collector electrode coupled to the cathode of the silicon controlled rectifier connected in the same stage in which said transistor is connected and an emitter electrode coupled to the gate electrode of the silicon controlled rectifier connected in the stage subsequent to the stage in which said transistor is connected and wherein each one of said plurality of said second signal transfer means includes a transistor having a base electrode coupled to said second transmission line, a collector electrode coupled to the cathode of the silicon controlled rectifier connected in the same stage in which said transistor is connected and an emitter electrode coupled to the gate electrode of the silicon controlled rectifier connected in the stage preceding the stage in which said transistor is located.

28. A control circuit as defined in claim 24 wherein said first, second and third transmission lines are selectively connected to said voltage source by means of a switching system comprising: a first switch having a first terminal connected to said voltage source and a second terminal connected to said first transmission line; a second switch having a first terminal connected to said voltage source and a second terminal connected to said second transmission line; a third switch having a first terminal connected to said voltage source and a second terminal connected to said third transmission line; and a cam for selectively actuating said first, second and third switches.

29. A control circuit as defined in claim 24 wherein said first, second and third transmission lines are selectively connected to said voltage source by means of a switching circuit comprising: a first double-pole double-throw switch having first, second, third and fourth terminals; means to connect said first terminal of said first double-pole double-throw switch to said voltage source; means to connect said third terminal of said first double-pole double-throw switch to said voltage source; a first series connected diode and capacitor connected between said second terminal of said first double-pole double-throw switch and said first transmission line; a second series connected diode and capacitor connected between said fourth terminal of said first double-pole double-throw switch and said third transmission line; a second double-pole double-throw switch having first, second, third and fourth terminals; means to connect said first terminal of said second double-pole double-throw switch to said voltage source; means to connect said third terminal of said second double-pole double-throw switch to said voltage source; a third series connected diode and capacitor connected between said second terminal of said second double-pole double-throw switch and said second transmission line; means to connect said fourth terminal of said second double-pole double-throw switch to said fourth terminal of said first double-pole double-throw switch; a first resistor connected between said common potential point and the common point of said first series connected diode and capacitor; a second resistor connected between said first transmission line and said common potential point; a third resistor connected between said common potential point and the common point of said second series connected diode and capacitor; a fourth resistor connected between said common potential point and said transmission line; a fifth resistor connected between said common potential point and the common point of said third series connected diode and capacitor; and a sixth resistor connected between said second transmission line and said common potential point.

30. A control circuit as defined in claim 24 wherein a plurality of not ground input circuits are provided, each of said not ground input circuits being coupled to a gate electrode of a different one of said silicon controlled rectifiers and wherein a plurality of ground input circuits are provided, each of said ground input circuits being coupled to a gate electrode of a different one of said silicon controlled rectifiers.

31. A control circuit as defined in claim 30 wherein said cam rotates in a clockwise direction for forward shifting and in a counterclockwise direction for reverse shifting.

32. A control circuit comprising: a plurality of stages, each stage including a silicon controlled rectifier having cathode, anode, and gate electrodes; first and second transistors each having emitter, collector and base electrodes, a voltage source, first, second and third transmission lines selectively connected to said voltage source; means to couple the emitter electrode of said first transistor to a common potential point; means to couple the emitter electrode of said second transistor to said common potential point; a first resistor connected between the base electrode of said first transistor and said third transmission line, means to couple the base electrode of said second transistor to the collector electrode of said first transistor; a second resistor connected between the base electrode of said second transistor and said voltage source; means to couple the collector electrode of said second transistor to the cathode electrode of the silicon controlled rectifiers of all of said stages; a plurality of signal storage means; means to couple a different one of said plurality of signal storage means between said common potential point and the cathode electrode of said silicon controlled rectifier of each of said stages; a plurality of first signal transfer means; means to couple a different one of said plurality of said signal transfer means between the signal storage means of each of said stages and the gate electrode of the silicon controlled rectifier of the subsequent stage; separate means for coupling each of said first signal transfer means to said third transmission line; a plurality of second signal transfer means; means to couple a different one of said plurality of said second signal transfer means between said signal storage means of each of said stages and the gate electrode of the silicon controlled rectifier of the preceding stage of said stages; and separate means for coupling each of said second signal transfer means to said second transmission line.

33. A control circuit as defined in claim 32 wherein separate input signal circuit means are coupled to each of the gate electrodes of all of said silicon controlled rectifiers and separate output signal means are coupled to the anode electrode of each of said silicon controlled rectifiers.

34. A control circuit as defined in claim 32 wherein each one of said plurality of signal storage means is a capacitor.

35. A control circuit as defined in claim 32 wherein each of said plurality of first signal transfer means includes a transistor having a base electrode coupled to said first transmission line, a collector electrode coupled to the cathode of the silicon controlled rectifier connected in the same stage in which said transistor is connected and an emitter electrode coupled to the gate electrode of the silicon controlled rectifier connected in the stage subsequent to the stage in which said transistor is connected; and wherein each one of said plurality of said second signal transfer means includes a transistor having a base electrode coupled to said second transmission line, a collector electrode coupled to the cathode of the silicon controlled rectifier connected in the same stage in which said transistor is connected and an emitter electrode coupled to the gate electrode of the silicon controlled rectifier connected in the stage preceding the stage in which said transistor is located.

36. A control circuit as defined in claim 32 wherein said first, second and third transmission lines are selectively connected to said voltage source by means of a switching system comprising: a first switch having a first terminal connected to said voltage source and a second terminal connected to said first transmission line; a second switch having a first terminal connected to said voltage source and a second terminal connected to said second transmission line; a third switch having a first terminal connected to said voltage source and a second terminal connected to said third transmission line; and a cam for selectively actuating said first, second and third switches.

37. A control circuit as defined in claim 32 wherein said first, second and third transmission lines are selectively connected to said voltage source by means of a switching circuit comprising: a first double-pole double-throw switch having first, second, third and fourth terminals; means to connect said first terminal of said first double-pole double-throw switch to said voltage source; means to connect said third terminal of said first double-pole double-throw switch to said voltage source; a first series connected diode and capacitor connected between said second terminal of said first double-pole double-throw switch and said first transmission line; a second series connected diode and capacitor connected between said fourth terminal of said first double-pole double-throw switch and said third transmission line; a second double-pole double-throw switch having first, second, third and fourth terminals; means to connect said first terminal of said second double-pole double-throw switch to said voltage source; means to connect said third terminal of said second double-pole double-throw switch to said voltage source; a third series connected diode and capacitor connected between said second terminal of said second double-pole double-throw switch and said second transmission line; means to connect said fourth terminal of said second double-pole double-throw switch to said fourth terminal of said first double-pole double-throw switch; a first resistor connected between said common potential point and the common point of said first series connected diode and capacitor; a second resistor connected between said first transmission line and said common potential point; a third resistor connected between said common potential point and the common point of said second series connected diode and capacitor; a fourth resistor connected between said common potential point and said transmission line; a fifth resistor connected between said common potential point and the common point of said third series connected diode and capacitor; and a sixth resistor connected between said second transmission line and said common potential point.

38. A control circuit as defined in claim 32 wherein a plurality of not ground input circuits are provided, each of said not ground input circuits being coupled to a gate electrode of a different one of said silicon controlled rectifiers and wherein a plurality of ground input circuits are provided, each of said ground input circuits being coupled to a gate electrode of a different one of said silicon controlled rectifiers.

39. A control circuit as defined in claim 36 wherein said cam rotates in a clockwise direction for forward shifting and in a counterclockwise direction for reverse shifting.

40. A control circuit comprising a plurality of identical stages, each stage including: an input terminal, switching means, a silicon controlled rectifier having a gate electrode coupled to said input terminal and a cathode electrode coupled to said switching means, a storage capacitor coupled between said cathode and a common potential point, a first voltage transfer transistor having a collector electrode coupled to said storage capacitor and an emitter electrode coupled to the input terminal of the next subsequent stage, a second transfer transistor having a collector electrode coupled to said storage capacitor and an emitter electrode coupled to the input terminal of the next preceding stage; a voltage source; means to selectively couple the base electrode of said first transistor and the base electrode of said second transistor to said voltage source; and means including said switching means for charging said storage capacitor when its associated silicon controlled rectifier is conducting.

41. A shifter circuit for a shift register comprising: a voltage source; a forward transmission line; a reverse transmission line; a normally open transmission line; a point of common potential; a first double-pole double-throw switch having first, second, third and fourth terminals; means to connect said first terminal of said first double-pole double-throw switch to said voltage source; means to connect said third terminal of said first double-pole double-throw switch to said voltage source; a first series connected diode and capacitor connected between said second terminal of said first double-pole double-throw switch and said reverse transmission line; a second series connected diode and capacitor connected between said fourth terminal of said first double-pole double-throw switch and said normally open transmission line; a second double-pole double-throw switch having first, second, third and fourth terminals; means to connect said first terminal of said second double-pole double-throw switch to said voltage source; means to connect said third terminal of said second double-pole double-throw switch to said voltage source; a third series connected diode and capacitor connected between said second terminal of said second double-pole double-throw switch and said forward transmission line; means to connect said fourth terminal of said second double-pole double-throw switch to said fourth terminal of said first double-pole double-throw switch; a first resistor connected between said common potential point and the common point of said first series connected diode and capacitor; a second resistor connected between said common potential point and said reverse transmission line; third resistor connected between the common point of said second series connected diode and capacitor and said common potential point; a fourth resistor connected between said common potential point and said normally open transmission line; a fifth resistor connected between said common potential point and the common point of said third series connected diode and capacitor and a sixth resistor connected between said common potential point and said forward transmission line.

* * * * *